United States Patent [19]

Martell et al.

[11] Patent Number: 5,684,971

[45] Date of Patent: Nov. 4, 1997

[54] RESERVATION STATION WITH A PSEUDO-FIFO CIRCUIT FOR SCHEDULING DISPATCH OF INSTRUCTIONS

[75] Inventors: Robert W. Martell, Hillsboro; Alexander P. Henstrom, Beaverton, both of Oreg.; Derek Edwin Pappas, Palo Alto, Calif.

[73] Assignee: Intel Corporation, Santa Clara, Calif.

[21] Appl. No.: 662,974

[22] Filed: Jun. 13, 1996

Related U.S. Application Data

[63] Continuation-in-part of Ser. No. 624,185, Mar. 29, 1996, abandoned, which is a continuation-in-part of Ser. No. 172,737, Dec. 27, 1993, Pat. No. 5,519,864.

[51] Int. Cl.$^6$ ........................................................ G06F 9/30
[52] U.S. Cl. ............................ 395/393; 395/390; 395/391; 395/673
[58] Field of Search ........................................ 395/393, 390, 395/391, 673

[56] References Cited

U.S. PATENT DOCUMENTS

| 5,220,653 | 6/1993 | Micro ................................ 395/677 |
| 5,560,025 | 9/1996 | Gupta et al. ....................... 395/800 |
| 5,613,080 | 3/1997 | Ray et al. .......................... 395/390 |
| 5,625,837 | 4/1997 | Popescu et al. ................... 395/800 |

*Primary Examiner*—Krisna Lim
*Attorney, Agent, or Firm*—Blakely, Sokoloff, Taylor & Zafman

[57] ABSTRACT

A reservation station includes a memory array in which micro-operations are stored at entry locations with an age representing a temporal ordering. Control circuitry resets the age of a new micro-operation, and increments the ages of previously stored micro-operations, when an entry is written into the array. Wired-OR circuitry is utilized to find the oldest age within the memory array, which is then broadcast through the array to generate a priority pointer that identifies a group of entries which contain an entry with the oldest age. Scheduling logic selects a ready entry in the group for dispatch to a port of the execution unit.

11 Claims, 10 Drawing Sheets

| 29L | 30H | 30L | 31H | 31L |
|---|---|---|---|---|
| increment uop age or reset uop age | wire-or read age for given priority pointer group | scan for oldest age for given priority pointer group | broadcast oldest age to find which entry is oldest.<br><br>scan for 1st oldest if more than one - send priorty pointer | begin scheduling selection at priority pointer location |

*Figure 6*

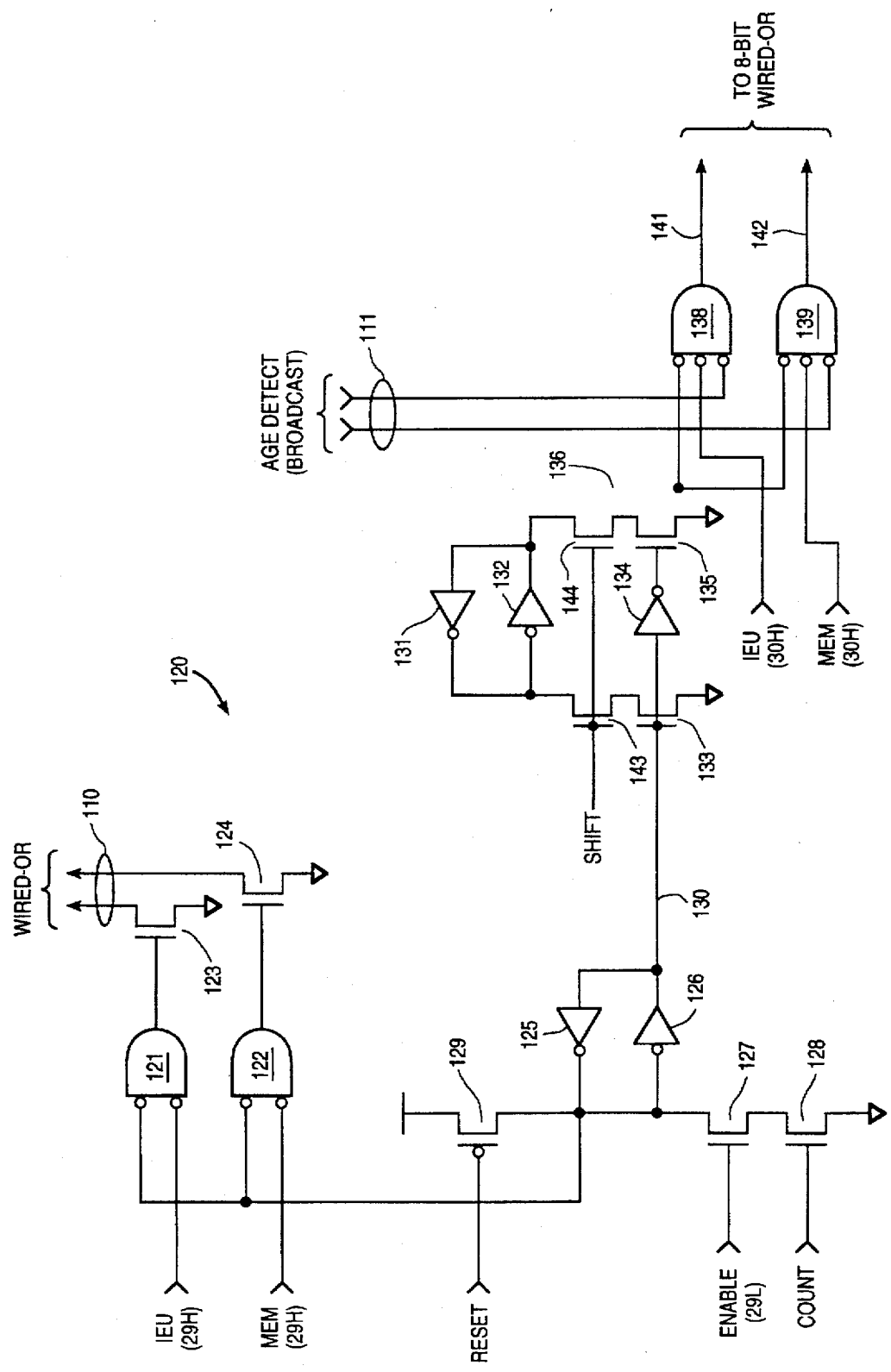

RESERVATION STATION WITH A PSEUDO-FIFO CIRCUIT FOR SCHEDULING DISPATCH OF INSTRUCTIONS

RELATED APPLICATIONS

This is a file-wrapper continuation-in-part application of Ser. application No. 08/624,185 filed Mar. 29, 1996, now abandoned, which is a continuation-in-part application of application Ser. No. 08/172,737 now U.S. Pat. No. 5,519,864 filed on Dec. 27, 1993 and issued on May 21, 1996, both of which are assigned to the assignee of the present application.

FIELD OF THE INVENTION

The present invention relates to the field of microprocessor architecture and circuit implementations thereof. More specifically, the present invention relates to logic circuitry utilized in the dispatch of microprocessor instructions.

BACKGROUND OF THE INVENTION

Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems. Superscalar microprocessors are capable of initiating more than one instruction at the initial stage of the pipeline per clock cycle; frequently, more than one instruction completes on each given clock cycle.

To operate efficiently, the instruction fetch unit should provide a continual stream of instructions to the pipeline. However, conditional branch instructions often prevent the instruction fetch unit from fetching the correct instruction until after the condition has been resolved. Since the condition is ordinarily not resolved until further down the pipeline, the instruction fetch unit may not be able to fetch proper instructions.

To overcome this problem, many pipelined microprocessors use branch prediction mechanisms that attempt to predict the outcome of branches and then fetch subsequent instructions according to the prediction. Branch prediction is achieved using a branch target buffer (BTB) that stores the history of a branch instruction based upon its instruction pointer or address. When a branch instruction is fetched, the branch target buffer predicts the target address of the branch using the branch history. Speculative execution is where instructions are initiated and completed before knowing if they are the correct instructions. This usually includes prediction with a BTB.

In addition to speculative execution, substantial increases in instruction throughput can be achieved by implementing out-of-order dispatch of instructions to the execution units. Out-of-order execution of a particular instruction is possible when that instruction does not depend upon the results of earlier instructions in the pipelined stream. With out-of-order execution, any number of instructions are allowed to be in execution in the execution units, up to the total number of pipeline stages for all the functional units. In out-of-order execution, instruction dispatching is typically stalled when there is a conflict for a functional unit or when a dispatched instruction depends on the result of an instruction that has not yet computed.

To prevent stalls, a reservation station (RS) may be employed between the decode and execute stages. A RS is a specialized buffer that temporarily holds decoded instructions until they can be dispatched to an execution unit. Dispatch occurs when an instruction is "data-ready"—meaning that its source operands have been computed and an execution unit is available. Data-ready instructions are dispatched from the reservation station regardless of their original program order. For further background on the use of reservation stations and out-of-order execution, see Mike Johnson, *Superscalar Microprocessor Design* and Prentice-Hall, Inc., 1991, Chapters 3 and 7.

Scheduling of instructions from the reservation station is a critical stage in the execution pipeline directly affecting system performance. Instructions cannot be scheduled until all data dependencies are resolved and an appropriate execution unit is available. Depending upon frequency and area sensitivities and the number of entries in the reservation station it may not be possible to check every reservation station entry for data readiness at every scheduling cycle. Precautions must also be taken in scheduling to prevent data-ready instructions from aging too long in the reservation station and going stale (thus possibly lengthening total program execution time).

As will be seen, the present invention overcomes the aforementioned difficulties by providing circuitry that enables highly efficient scheduling of instructions in a pseudo first-in-first-out (FIFO) manner.

SUMMARY OF THE INVENTION

The present invention is a reservation station with a pseudo-FIFO circuit for scheduling dispatch of instructions when more than one instruction is ready for execution by the same execution unit. Rather than scanning every entry in the reservation station for the oldest ready entry, the reservation station entries are segmented into groups of entries with each group being scanned to determine which has the oldest entry therein. It is from the oldest ready group that a sequential scan begins, wrapping around when necessary.

The reservation station includes a memory array in which micro-operations are stored at entry locations with an age. The age represents the temporal ordering of all micro-operations stored in the array. Control circuitry associated with each entry of the memory array resets the age of a new micro-operation when it is written into the array. When a new entry is written into the array, the pointer circuitry also increments the ages of previously stored micro-operations. Comparison logic is included to compare the current age of each entry with the oldest detected age. The result is a priority pointer that identifies which entry or entries have the oldest age.

The oldest age is detected with a circuit that comprises a wired-OR connection with the pointer circuitry. The age detect circuit finds the oldest age within the memory array and then broadcasting that age through the memory array so that the comparison logic can make its identification. Scheduling logic selects a ready entry from the memory array for dispatch to a port of the execution unit. Importantly, a beginning scan point for selection of the ready entry is determined by the priority pointer.

BRIEF DESCRIPTION OF THE DRAWINGS

The present invention will be understood for fully from the detailed description which follows and from the accompanying drawings, which however, should not be taken to limit the invention to the specific embodiments shown, but rather are for explanation and understanding only.

FIG. 6 illustrates a portion of a microprocessor pipeline in accordance with one embodiment of the present invention.

FIG. 8 is a circuit schematic diagram of the pointer circuitry utilized in one implementation of the present invention.

DETAILED DESCRIPTION

The present invention provides circuitry for scheduling the dispatch of data-ready instructions to an execution unit. In the following description, numerous specific details are set forth, such as particular architectures, functional units, circuits, etc., in order to provide a thorough understanding of the present invention. It should be understood, however, that these specific details need not be used to practice the present invention. In other instances, well known structures, circuits, methods, etc., have not been shown in detail or have been presented in block diagram form in order to avoid obscuring the invention.

Figure 1:
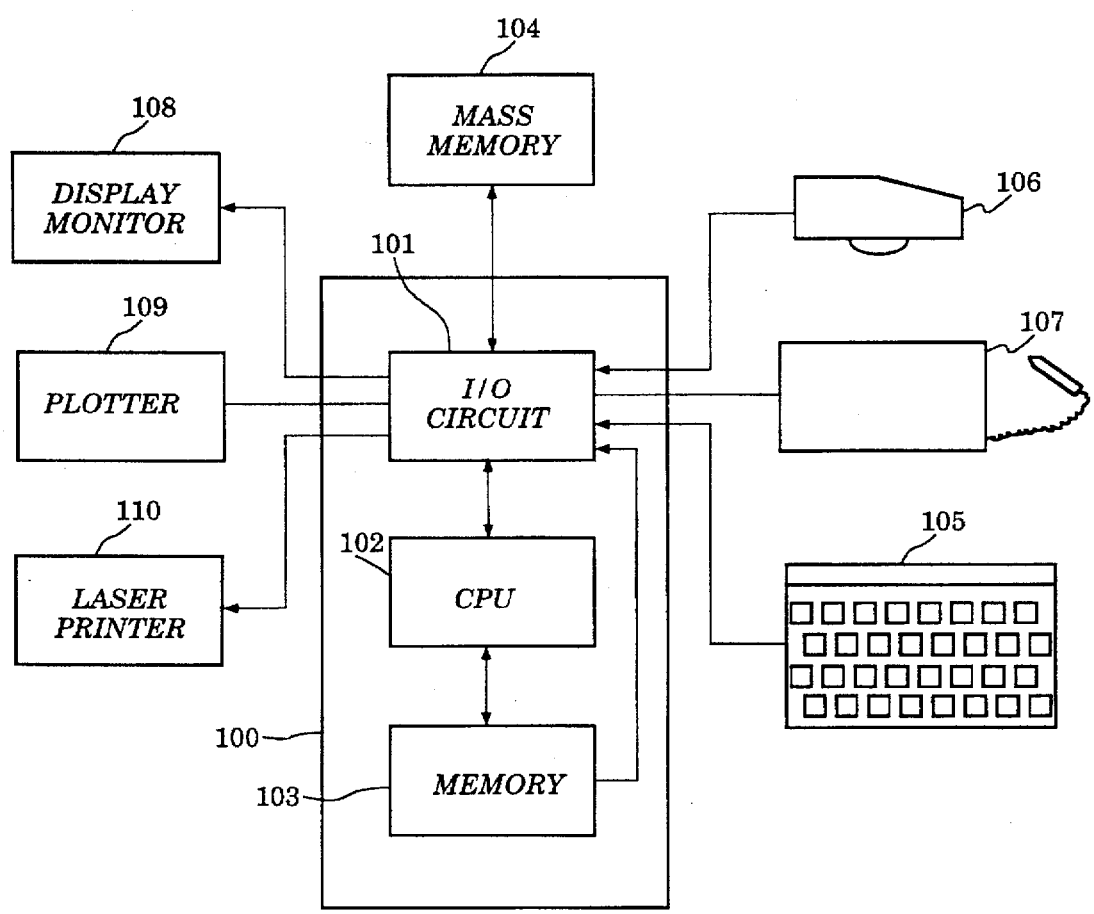
FIG. 1 is a computer system that may incorporate the circuitry of the present invention.

Referring to FIG. 1, a computer system that may incorporate the circuitry of the present invention is illustrated. Computer 100 comprises three major components: input/output (I/O) circuit 101, which is used to communicate information in appropriately structured form to and from other parts of the computer 100 as well as out of the computer 100, central processing unit (CPU) 102, and memory 103. These two latter elements are those typically found in most general purpose computers and nearly all special purpose computers. The elements contained within computer 100 are intended to be representative of this broad category of data processor.

Also shown in FIG. 1 is an input device 105, e.g., a keyboard. There is also shown as an input device a graphics tablet 107. It should be understood, however, that the input device may actually be in any other well-known input device (including, of course, another computer).

A mass memory device 104 is coupled to I/O circuit 101 and provides additional storage capabilities for computer 100. Mass memory 104 may include other programs and may take the form of a magnetic or optical disc drive, or any other well-known memory device. It will be appreciated that the data retained within mass memory 104, may, in appropriate cases, be incorporated in standard fashion into computer 100 as part of memory 103.

In addition, three typical computer display devices are illustrated: a display monitor 108, a plotter 109, and a laser printer 110. Each can be used to display images or documents or other data utilized by computer 100. A cursor control device 106 (e.g., a mouse, trackball, stylus, etc.) is coupled to I/O circuit 101. Other pointing devices may suitably be used as appropriate.

The circuitry of the present invention will be described in conjunction with a microprocessor that executes the well-known Intel Architecture™ instruction set. The present invention may, however, be implemented in any microprocessor architecture in which a reservation station is utilized for storing instructions until data and resource dependencies are resolved. A variety of microprocessors may take advantage of the present invention whether those microprocessors occupy a single chip or more than one and regardless of the materials used to fabricate the chip including silicon or gallium arsenide.

Prior to executing instructions, the processor decodes them into a more simple, stylized sequence of micro-operations, or "micro-ops." The micro-ops are then analyzed and scheduled according to resolved dependencies thus implementing out-of-order execution. Some complex instructions translate into multiple micro-ops which may or may not be related to one another. Simple instructions map directly into a unique micro-op (such as XOR or ADD).

Figure 2:
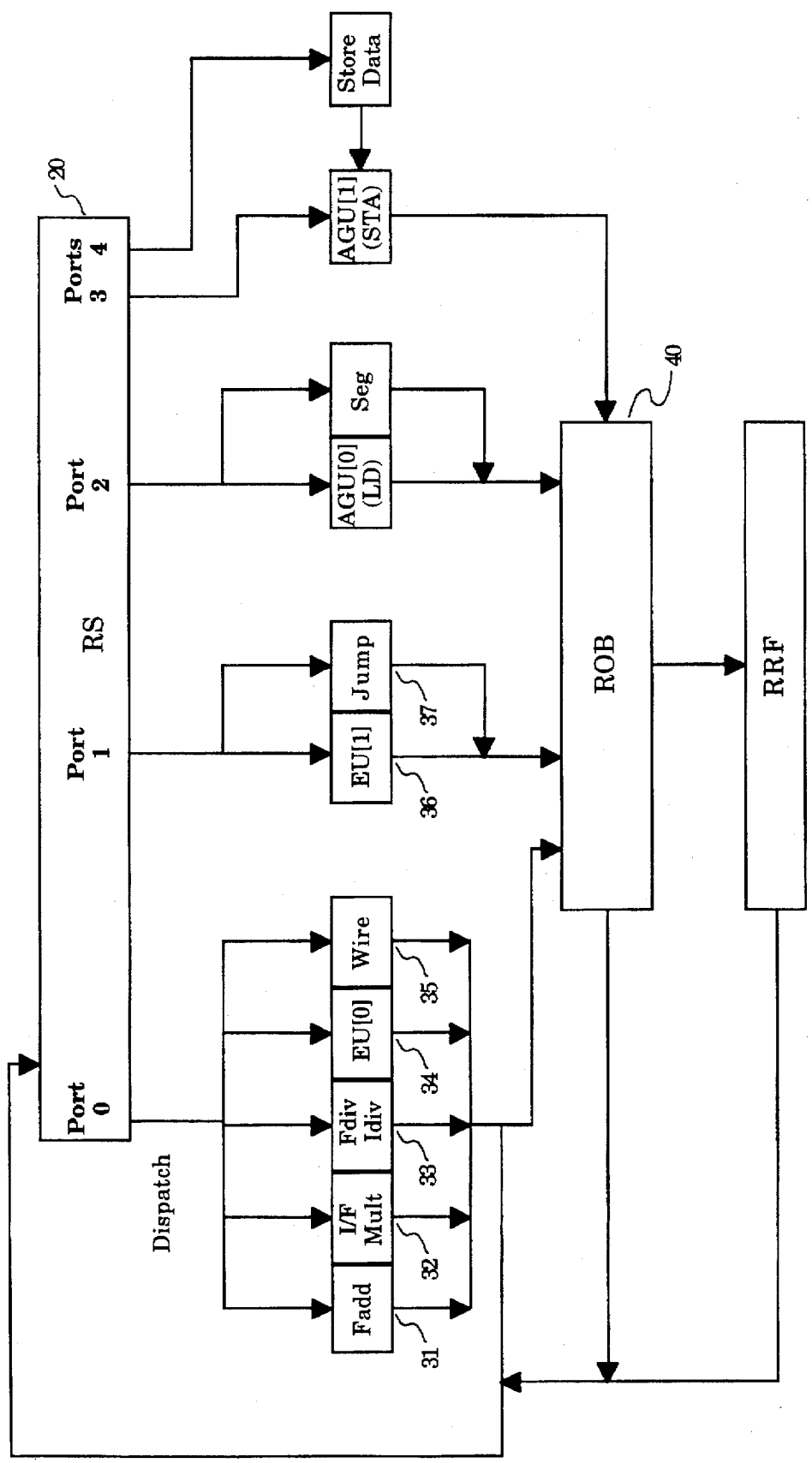
FIG. 2 illustrates a portion of a microprocessor incorporating the present invention.

FIG. 2 illustrates a portion of a microprocessor incorporating the present invention. The portion illustrated in FIG. 2 is the out-of-order core of the microprocessor; it includes reservation station (RS) 20, reorder buffer (ROB) 40, real register file (RRF) 50, and other various logic blocks.

As described earlier, RS 20 is a buffer that holds micro-ops waiting for resources in order to execute. These resources include the source data operands and a functional unit with which to execute the micro-op. Reservation station performs several functions. Its data fields serve as a temporary buffer for instructions and the source data that is or will be available. The reservation station maintains waiting instructions and is "watching" all the result/write back buses from all the execution interfaces "looking" for source data that it needs for its micro-ops. When the watched-for data arrives on the result bus, the reservation station writes it into the appropriate source data field. Once all the source operands for a micro-op are available, the reservation station determines when an appropriate execution unit is available and schedules the data ready micro-op for dispatch.

The embodiment of FIG. 2 shows RS 20 as having five dispatch ports. Five execution units are coupled to Dispatch Port 0 from reservation station 20. These are the floating point add unit 31, the multiply unit 32 (for performing integer and floating point multiplies), integer and floating point divide unit 33, integer execution unit 34, and a wire unit 35.

As explained earlier, complex microprocessor instructions are reduced to a simpler stream of micro-ops. These micro-ops, when they are dispatched from the reservation station, are operated on by the various execution units. Most applications utilize integer execution unit 34, which is designed to process data-ready micro-ops in one clock cycle. It is therefore referred to as a single-cycle functional unit. Integer execution unit 34 receives data having a width of 32 bits.

Floating point execution units 31, 32 and 33 carry out more complicated tasks when they receive data-ready micro-ops. These functional units receive input streams having a width for 86-bits of source data.

Dispatch port 1 of reservation station 20 is shown having two execution units coupled to it. There is an integer execution unit 36 and a jump unit 37. The integer execution unit 36 may be identical to the execution unit 34, or it may have additional or different functionality. Two integer execution units are provided because of the high volume of integer micro-ops common in most code thereby enhancing performance of the overall system. Of course, alternative microprocessors may incorporate more or fewer execution units depending upon design objectives.

After an execution unit executes a micro-op, it writes back the result to ROB 40. ROB 40 serves as the place where the results of out-of-order operations are collected so that they can later be committed to machine state in strict von Neumann order. Thus, ROB 40 is where the out-of-order core reassembles the instruction stream into its original program order before commitment to state. At the same time that the execution units write back results to ROB 40, they simultaneously write back to RS 20. It may be that the result of an execution unit's operation provides a source operand needed for the execution of another micro-op waiting in the reservation station.

The scheduling mechanism of the present invention may be incorporated in any out-of-order execution system utilizing one or more reservation stations for waiting micro-ops. For purposes of illustration, the reservation station arrangement illustrated in FIG. 3 will be described as representative of this class of microprocessor implementation. In the described embodiment, RS 20 is implemented such that twenty (20) micro-ops at one time may be waiting for all necessary resources required for dispatch to an execution unit.

Figure 3:
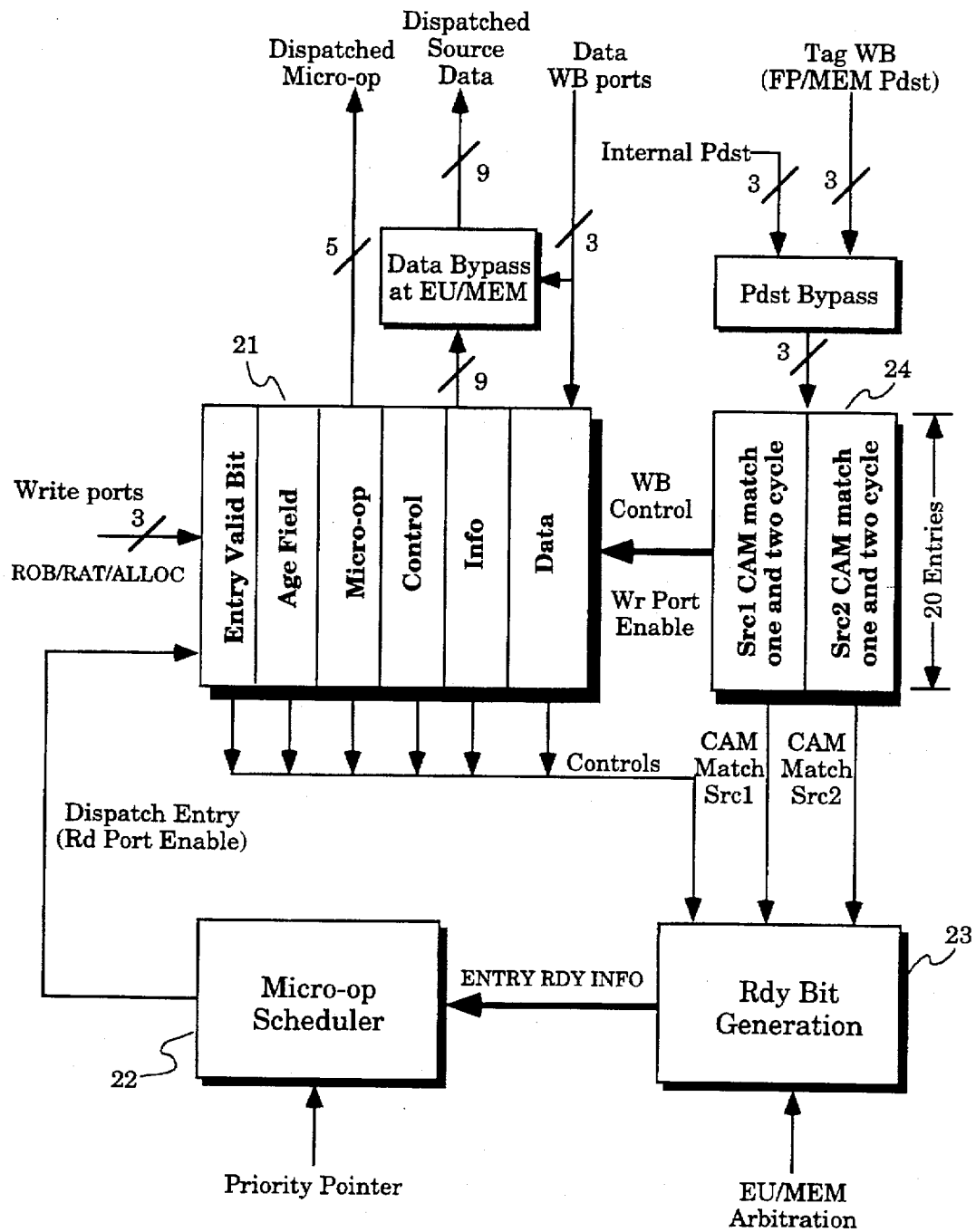
FIG. 3 illustrates a more detailed diagram of a reservation station which incorporates the scheduling circuitry of the present invention.

In FIG. 3, the micro-ops and associated data are shown as a large array 21. The content of information for a given micro-op includes the micro-op instruction, source operands, control bits indicating the validity of the source data as well as information indicating the necessary functional unit for a given micro-op to be dispatched to. The embodiment shown has micro-ops written into RS 20 with data indicating a particular execution unit to be dispatched to. Alternatively, it is possible to couple together the various schedulers such that a data-ready micro-op capable of executing on multiple execution units may be scheduled to the first one available. By dynamically binding a micro-op to a functional unit at scheduling, rather than statically binding at allocation, improvements to overall system performance may be obtained.

Coupled to array 21 is the micro-op scheduler 22. Micro-op scheduler 22 peruses array 21 looking for data-ready micro-ops to dispatch. A micro-op is data-ready when all valid source data has been determined by the reservation station and an appropriate functional unit is available. Valid source data is determined either by receipt of the data or upon receiving information that the data will be ready in time for scheduling.

Micro-op scheduler 22 is informed of ready micro-ops by receiving a signal from the ready bit generation logic 23. Ready bit generation logic 23 receives input signals that indicate the availability of functional units, the activation of valid bits for source data from the reservation station, and any data forwarding information detected by the content addressable memory (CAM) logic 24 which performs tag matching for needed data being concurrently written back.

Figure 4:
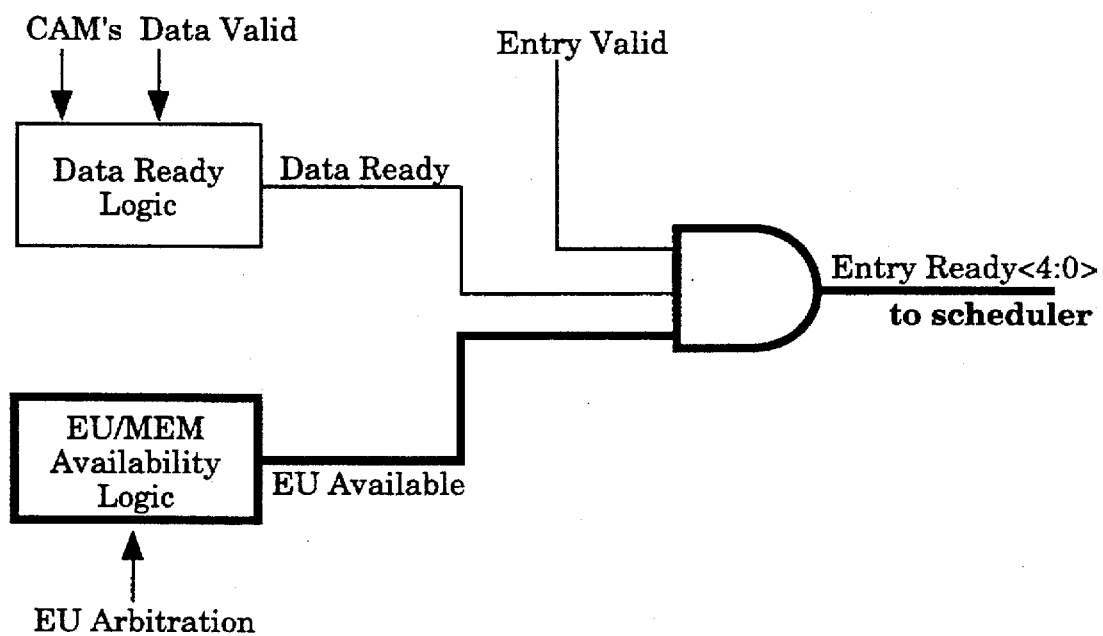
FIG. 4 illustrates a portion of the logic used for indicating data-ready operations stored in a reservation station.

FIG. 4 illustrates a logical block diagram of ready bit generation logic 23 to which all dependencies for a micro-op must be signaled before an entry ready bit is supplied to micro-op scheduler 22 for a given micro-op. Micro-op scheduler 22 also receives a priority pointer to specify where the scheduler should begin its scan of the RS entries. The priority pointer changes according to a pseudo-FIFO algorithm to be described further herein. It should be noted that once a micro-op has been dispatched to a functional unit, and no cancellation has occurred due to a cache miss or other reasons, the entry is de-allocated in the reservation station for use by a new micro-op.

Figure 5:
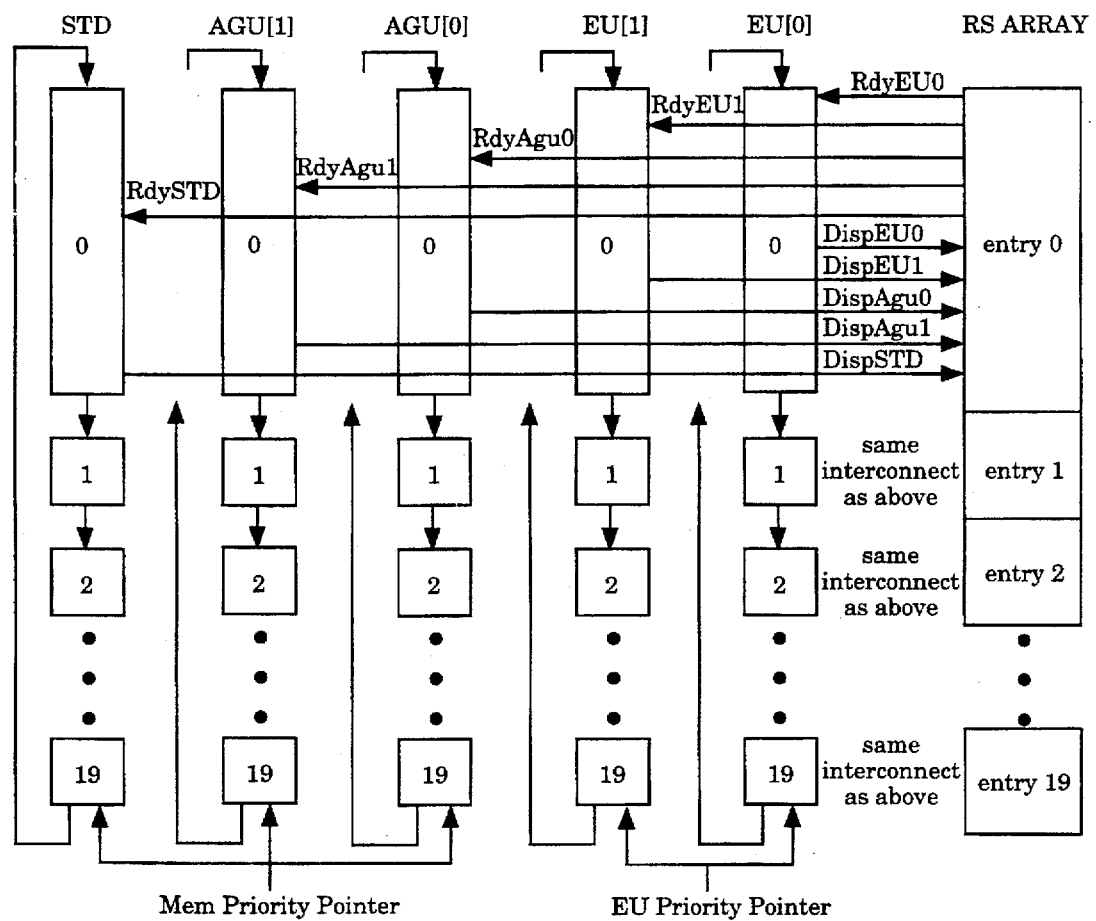
FIG. 5 is a representation of the plurality of schedulers used for a plurality of dispatch ports in accordance with the present invention.

A basic function of micro-op scheduler 22 is to enable the scheduling of up to five micro-ops per clock cycle from the RS. RS 20 has five schedulers, one for each dispatch port. Each entry in RS 20 array has five ready signals, one for each execution unit scheduler. The purpose of the ready signals is to inform the scheduler to what possible execution unit a given micro-op may be dispatched. The five dispatch signals enable the appropriate read port for a given entry in the reservation station array and is illustrated graphically in FIG. 5.

The primary goal of the micro-op scheduler's operation is to approximate FIFO-type scheduling, i.e., the oldest ready micro-op will always be scheduled first when more than one micro-op is ready for the same execution unit at the same time. This reduces stale entry effects which may diminish performance. Stale entry effects occur when older micro-ops in the array are given lower scheduling priority than newly written micro-ops. Reservation station 20 implements a pseudo-FIFO scheduling algorithm to optimally schedule micro-ops for dispatch and keep stale data effects to a minimum.

As is illustrated in FIG. 3, array 21 includes an age field used to indicate how long each micro-op has been present in RS 20. As an alternative to incorporating an age field within the array, an external counter or counters may be used on either a per entry or per group of entries basis for writing the counter value into a non-count age field. If a counter is allocated to a group of entries, new micro-ops written into the group will inherit the age of the entire group. In other embodiments, the age information may be eliminated altogether by using a pure sequential scanning technique.

The scheduling routine models the reservation station array as a circular queue and begins micro-op selection (sequential scan) dependent upon the relative age of the micro-ops in the array. Essentially, program order dictates scheduling priority when more than one micro-op is ready to be scheduled for the same execution unit interface. Each entry in the array has an age counter that saturates at a count=8. This counter is reset at initial allocation and is incremented for each new write into the array. The writing of new entries into the array at a given clock cycle increments all other valid entries one count. As an alternative to incrementing the age counters on an array write, it may be desirable on some implementations to only increment the age counters upon the writing of branch instructions. Additionally, counters may be implemented both internally or externally to the array dependent upon die area and other efficiency considerations. Likewise, it should be understood that the use of a counter which saturates at count=8 is specific to the presently described embodiment. Of course, counters accommodating higher or lower counts are possible.

The age information for a micro-op entry may also be used to control the priority of a given micro-op. Rather than having the age field or counter reset when the entry is written into the array, the age information may be set to a predetermined specific value thus artificially indicating that the entry has a higher priority than if it were treated as other newly written entries into the array. Compilers may take advantage of this feature to indicate when some instructions are of a higher priority than others.

FIG. 6 illustrates a portion of the execution pipeline of a microprocessor incorporating the present invention. A solid line indicates the first half of the clock cycle while a dashed line separates a high clock from a low clock in a given clock cycle. Each of these stages of the pipeline illustrated in FIG. 6 are those carried out for the pseudo-FIFO scheduling of dispatch from RS 20 and each will be described below:

At pipeline stage 29L the entry's age is reset if it is being allocated, or is incremented when new micro-ops are written in the array.

During pipe stage 30H, a poll is taken with respect to which entry for a given execution interface has the oldest age. Since there are five schedulers, up to five separate interface searches can be taken. In one implementation there are two independent selections. Units EU[0]/1 are combined to form an age poll for all micro-ops in the array that are executable on these ports. AGU[0]/1 is the other age poll. The priority pointer generated from the EU[0]/1 age poll is sent to both the EU[0] and EU[1] schedulers. The priority pointer generated from the AGU[0] and AGU[1] age poll is sent to the AGU[0], AGU[1], and STD schedulers. It should be noted that STD micro-op's age information is not used in the scheduling process of the described embodiment. The STD ages can be ignored because their results are not as critical because other micro-ops will in general not be dependent upon a STD micro-op. The STD scheduler follows the AGU[0] and AGU[1] age group selections. At pipestage 30L, the oldest age for a given interface is determined by the method to be described further herein.

At stage 31H, the oldest age found for a given interface is broadcast through the array to find which entry has that age. If more than one entry has the same age for the given interface, a scan for the first oldest is used to arbitrate. The priority pointers are then sent to the associated schedulers. Finally, at stage 31L priority pointers dictate which entry to begin schedule selection. If the oldest entry in the array for the given interface is not ready for execution, then a sequential scan is done with proper array wrap-around.

It should be noted that in the described embodiment, the age detection circuitry and schedulers are broken up into five groups of four entries. Accordingly, when the age is broadcast in stage 31H, the group of 4 entries containing the oldest entry is found, not the oldest entry itself. Thus, the scheduler begins selection starting on a group boundary.

Once the priority pointer identifies the group of four entries which includes the oldest entry, the scheduler proceeds to schedule the first ready micro-op within the group regardless of the age of the first ready micro-op. It is possible that the oldest entry in the group is preceded by a ready, younger micro-op which then becomes scheduled prior to the scheduling of the older micro-op. Though the scheduling is not true FIFO in such a situation, these situations are not too common and are a fair trade off for the lower impact on frequency and die area required by the pseudo-FIFO scheduling mechanism.

Figure 7:
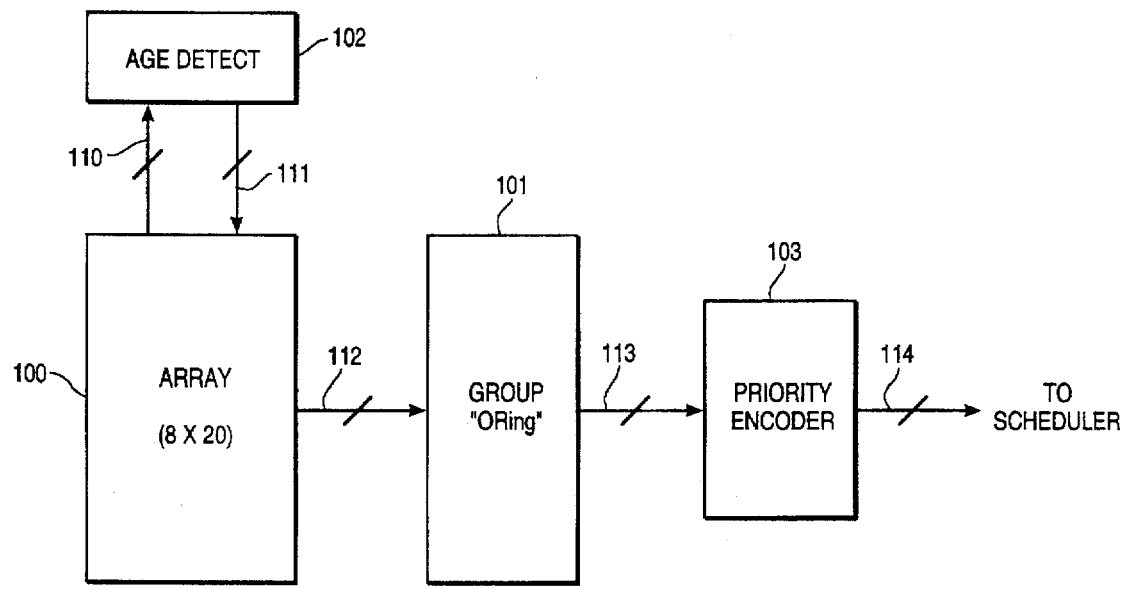
FIG. 7 is a block diagram of the pseudo-FIFO circuitry of the present invention.

With reference now to FIG. 7, there is shown a conceptual block diagram of the pseudo-FIFO scheduler circuitry of the present invention. The various logic circuits, which will be described in more detail shortly, may be implemented utilizing various logic families including domino logic circuitry. According to the invention, the FIFO mechanism is implemented by associating an age with each entry of the reservation station. This is represented in FIG. 7 by array portion 100 comprising an 8 bit by 20 entry array. The 20 entries represent the number of entries of the reservation station, and the 8 bits are utilized to indicate the age associated with a particular entry. Note that the implementation of the age is stored utilizing an 8-bit shift register within array portion 100. In one embodiment, three micro-ops are written as a group into the reservation station. At the time a group is written, the age associated with that particular group is reset. This means that each micro-op within a group maintains the same age. At the time that the age is reset for the new group, the age of existing groups is incremented. Note that age is incremented only when a new group entry arrives, not during dead cycles of the processor.

A wired-OR read is performed through array portion 100 to detect the oldest age within the array. The wired-OR connection is illustrated in FIG. 7 by lines 110 coupled to age detect circuitry 102. Age detect circuitry 102 is utilized to detect the bit that represents the oldest age within the array. That age is then broadcast down through the array along lines 111; basically ANDing the oldest age with each entry to determine which entry the information associated with the oldest entry is then output on lines 112.

Group ORing circuitry 101 receives as an input the four entries from the group determined to be the oldest within array 100. Circuitry 101 ORs the four entries together to identify if the group contains the oldest entry. Group ORing circuitry 101 receives 20 bits along input lines 112 and outputs five bits on lines 113. Priority encoder circuitry 103 is utilized to determine which of the five bits has priority next. The following priority encoding, only one of the five bits is set on output lines 114 coupled to the scheduler. The schedulers are responsible to pick at most one entry for dispatch to an execution unit.

Referring now to FIG. 8, there is shown a 1-bit cell, priority pointer circuit 120 that comprises a portion of array 100. Circuit 120 is duplicated 20 times (×8 bits), one copy per entry of the reservation station, Priority pointer circuit 120 contains one bit of the current relative age of each entry and control logic which is used to find the oldest entry in the array for ports 0–1 (IEU) and ports 2–4 (MEM). The output is 2–5 bit priority pointers (EU and MEM) that indicate which of the five scheduling groups contains the oldest entry. Note that in FIG. 8, lines 141 and 142 comprise 112 of FIG. 7 coupled to a group ORing circuit 101.

The left hand portion of circuit 120 receives as inputs a reset line coupled to the gate of transistor 129, and enable and count inputs coupled to the gates of transistors 127 and 128, respectively. Transistors 129, 127 and 128 are coupled in series between a positive supply potential and ground. The age bit associated with the entry is latched utilizing inverter 125 and buffer 126. The age bit is latched on line 130 coupled to the gate of transistor 133 and the input of inverter 134.

Ports 0 and 1 providing the ALU functions (IEU) are coupled to one of the inputs of gate 121. Memory functions head ports 2 and 3 (MEM) are coupled to one of the inputs of gate 122. (Note that the reference "29H" refers to the pipestage clock cycle referenced to FIG. 6. The other input of gates 121 and 122 is coupled to the output node of gate 125.) The outputs of logic gates 121 and 122 are couple to the gate of transistors 123 and 124, respectively. Lines 110 coupled to transistors 123 and 124 provide the wired-OR connection through the array that determines the oldest age within the array.

When an entry is first allocated, the reset line is asserted to initialize the 8-bit shift register to 0000000. The count for other entries is incremented at this time. The read ports provided by lines 110 are then utilized to read out the age for either IEU or MEM-type micro-OPS. Age detect circuitry 102 (FIGS. 7 and 9) is then utilized to find out what is the oldest age and then broadcast that age down through the array. Each entry then compares to see if it is the oldest entry.

The age detect broadcast occurs via lines 111 in the priority pointer circuitry 120 of FIG. 8. Lines 111 are respectively coupled to one input of gates 138 and 139. A second input of gate 138 is coupled to ports 01 (IEU), whereas second input of gate 139 is coupled to ports 2 and 3 (MEM). Inverters 131 and 134, buffer 132, and transistors 133 and 135 are connected as shown to the age bit on line 136 coupled to a third input of gates 138 and 139. Practitioners familiar in the field of digital logic circuitry will understand that assertion of either of lines 141 or 142 means that the associated entry is equal to the oldest entry in the array.

Figure 9:
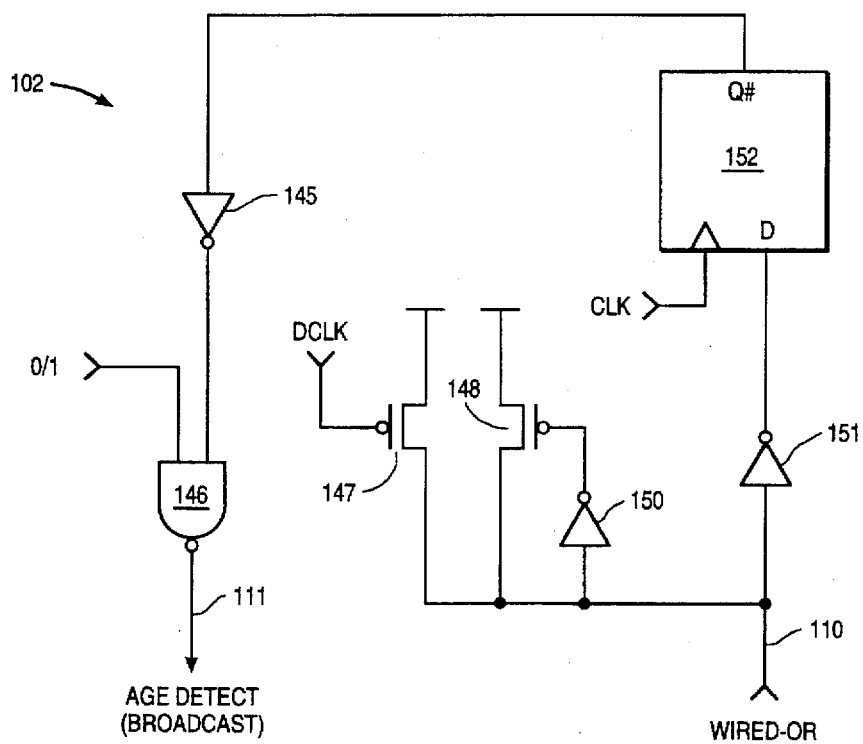
FIG. 9 is a circuit schematic diagram of the age detection circuitry utilized in one implementation of the present invention.

Age detect circuit 102 is illustrated in the circuit schematic diagram of FIG. 9. Wired-OR line 110 is shown connected to the inputs of inverters 150 and 151 and to the sources of transistors 147 and 148. The output of inverter 150 is connected to the gate of P-channel transistor 148 while the drain of transistor 148 is coupled to the positive supply potential. Similarly, the drain of transistor 147 is coupled to the positive supply and the gate of transistor 147 is coupled to a delayed clock signal (DLCLK). The output of inverter 151 is coupled to the data input of latch 152. Latch 152 is clocked by a clock signal labeled CLK in FIG. 9, and has an output that is coupled to the input of inverter 145. The output of inverter 145 is coupled to one input of NAND gate 146. The other input of gate 146 is utilized to enable the gate once a "01" neighboring bit combination is detected in the 8-bit field. Note that a zero bit next to a one bit indicates the presence of the oldest age detected. This oldest age is then broadcast through the array along line 111. As described above, each entry is then compared with the oldest age to determine which is the oldest entry in the array.

Figure 10:
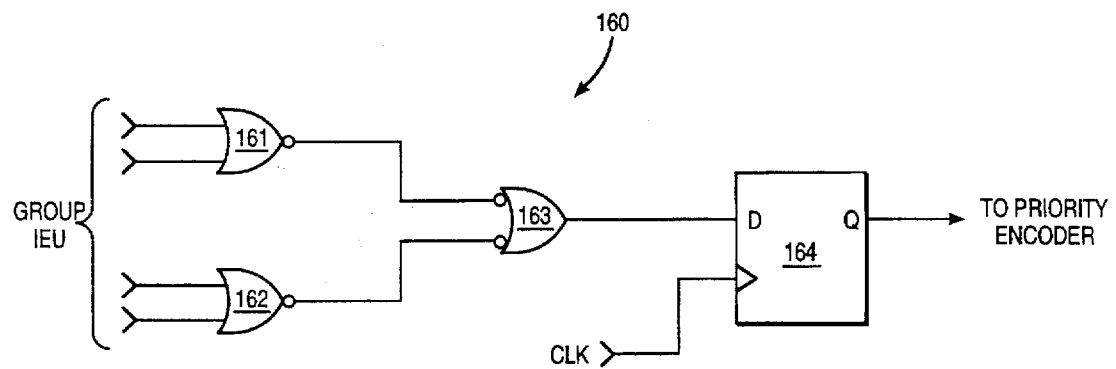
FIG. 10 is a logic diagram of ORing circuitry utilized in one embodiment of the present invention.

FIG. 10 shows a circuit 160 that comprises a portion of group ORing circuit 101. Circuit 160 represents the logic circuitry that is associated with the IEU ports, whereas a similar circuit is utilized for the MEM ports 2, 3. The circuit illustrated in FIG. 10 comprises a pair of NOR gates 161 and 162 having their outputs coupled as inputs to gate 163. The output of gate 163 is latched utilizing flip-flop 164. The output of flip-flop 164 is coupled to the priority encoder circuitry. As will be appreciated by those of ordinary skill in the art, circuitry 160 may be utilized to determine which group has the oldest age within the array. Note that the oldest entry within the group might appear anywhere within the group. Later, ordinary arbitration logic is utilized to select the first entry within the group in a top down manner, even though that entry may not be the oldest entry within the group. This is where the term "pseudo-FIFO" arises from since a group having the oldest entry may be selected; however, the first entry dispatched within that group may not be the oldest entry.

Figure 11:
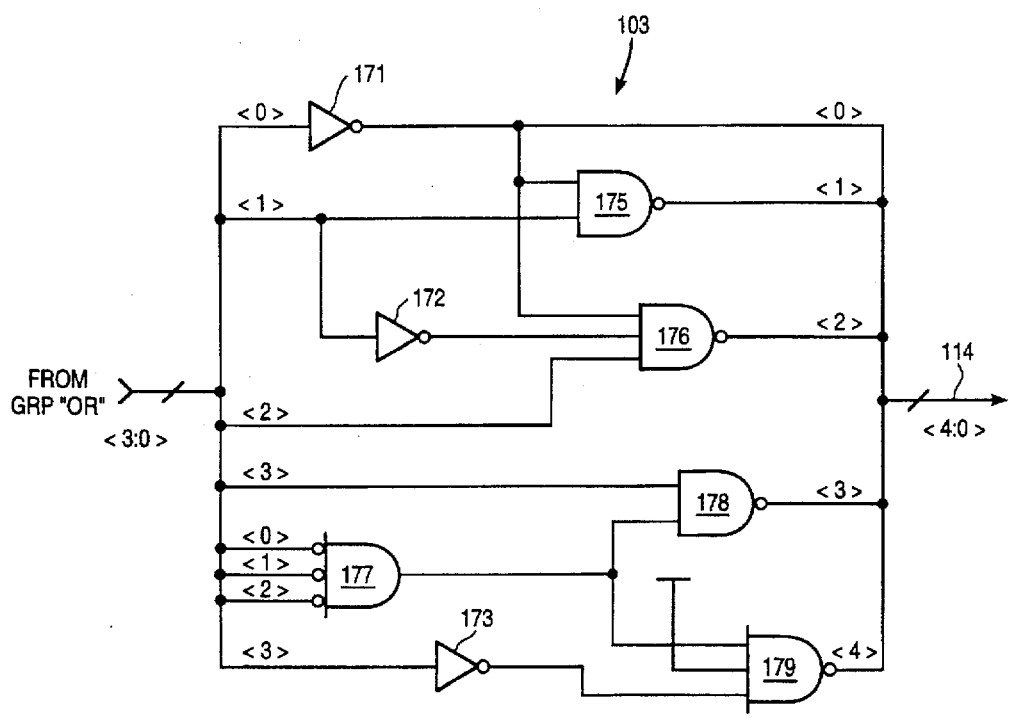
FIG. 11 is a logic diagram of the encoding circuitry utilized in one embodiment of the present invention.

FIG. 11 represents logic circuitry associated with priority encoder circuit 103. Circuit 103 receives its input from the output of group ORing circuit 101. As was the case in the description of FIG. 10, the circuit of FIG. 11 may be duplicated for both the IEU and MEM portions. The circuit of FIG. 11 comprises inverters 171, 172 and 173 coupled as shown with gates 175–179. The inputs to FIG. 11 are represented as one of the five groups containing four entries. That is, the selection of the oldest group includes the four entries within that group. These are shown in FIG. 11 as <3:0>. Note that the output along line 114 in FIG. 11 represents the five ready bits that are used to arbitrate.

As discussed above, each scheduler is broken up into five groups of four reservation station entries each. The priority pointer logic described above is coupled to the schedulers and is responsible for maintaining the relative ages of the valid entries in the reservation station and for determining which entry is the oldest. The priority pointer, as represented by lines 114, are used to specify where the scheduler should begin its scan of the RS entries. This is performed in a pseudo-FIFO manner.

The five groups are arbitrated by the priority pointer logic made up of two-stage domino circuitry. The first stage comprises a group arbitration, utilizing the five ready lines to disable the groups that have not been selected. A second stage arbitration arbitrates on the individual entries within the selected group to determine if another reservation station entry in a group has higher priority. In this way, the ready signals notify the scheduler to which execution port a given micro-op can be dispatched. The five dispatch signals enable the appropriate port read for a given entry in the RS array. For example, if an entry executes on port zero, and both of the sources are data ready, it will receive a ready signal on zero port line and the others will be deasserted. Note that the zero port is only coupled to scheduler zero in the described embodiment.

Figure 12:
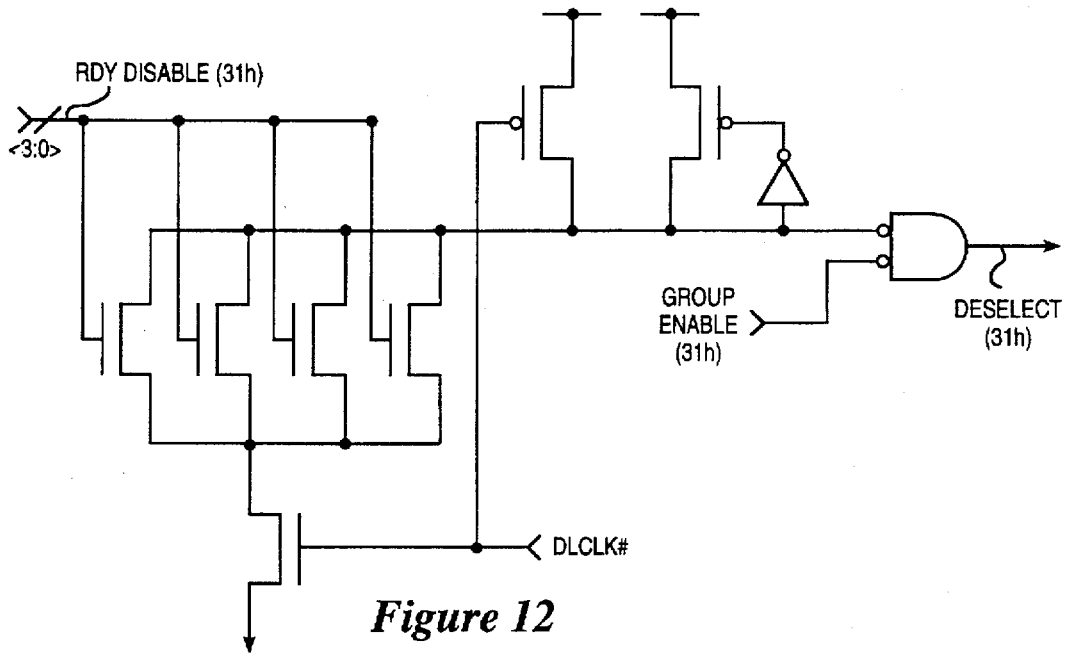
FIG. 12 illustrates one type of domino cell utilized in the scheduling circuitry of the present invention.
Figure 13:
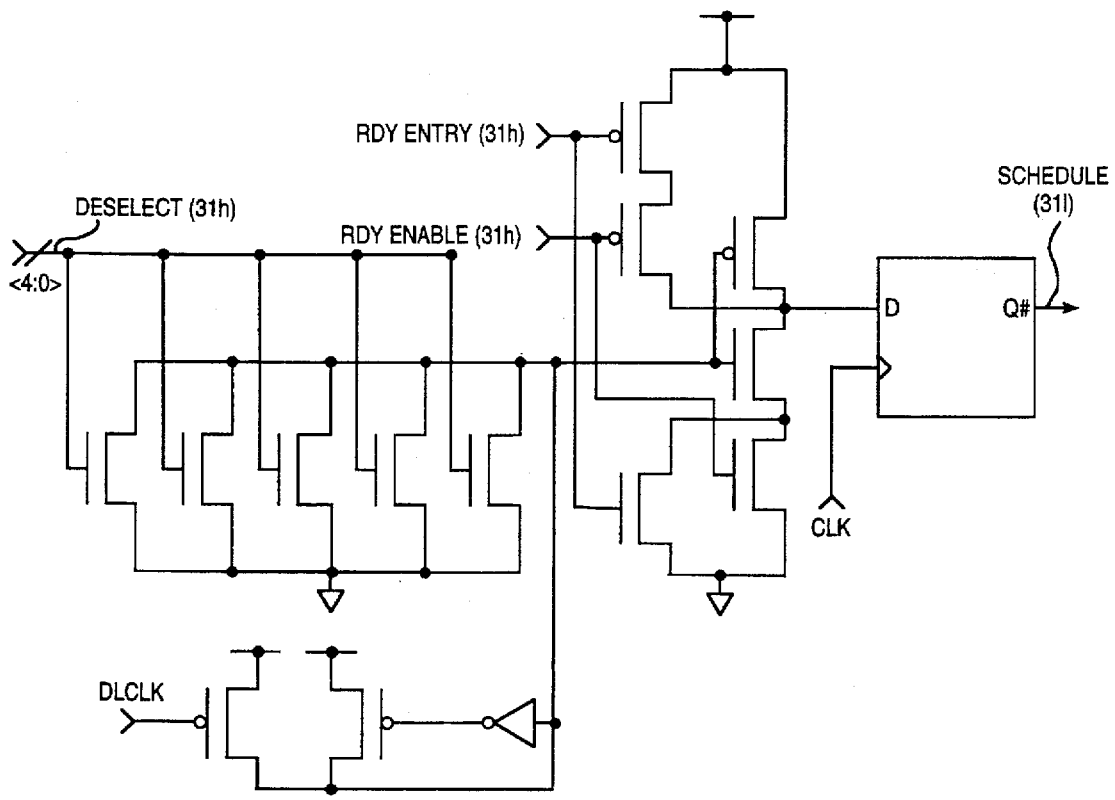
FIG. 13 illustrates another type of domino cell utilized in the scheduling circuitry of the present invention.

One embodiment of the two stage domino scheduling logic is shown in the circuit schematic diagrams of FIGS. 12 and 13. The D1 type domino cell shown in FIG. 12 and the D2 type domino cell shown in FIG. 13 are arrayed fed with programmed signals to construct each scheduler. As will be apparent to one familiar with digital logic, the precharge value is "schedule", but if any higher priority entry is also ready for dispatch then the domino logic will be discharged. If a current entry is not ready, then the domino output is qualified and determined not ready.

To summarize, the 20 entries of the reservation station array produce an 8-bit wired-OR indicating the oldest entry in the array. This oldest age is then broadcast down through the array and matched to the corresponding entry. ORing logic determines which group has the oldest entry. The 5-bit priority vector produced on lines 114 is utilized to disable or deselect the groups that are not the oldest. Within the selected group, arbitration occurs at another level to determine which micro-ops (i.e., entries) are ready to be scheduled to dispatched to an execution unit.

We claim:

1. A reservation station (RS) that dispatches micro-operations (uops) specified by instruction of a microprocessor to an execution unit, the RS comprising:

a memory array having a plurality of entries, a uop being stored at each entry with an age representing a temporal ordering of all uops stored therein;

control circuitry associated with each entry of the memory array that resets the age of a new uop and increments ages of previously stored uops when the new uop is written into the array, the control circuitry also including comparison logic that compares a current age of each entry with an oldest age and produces a priority pointer identifies an oldest entry having the oldest age;

an age detection circuit coupled with the control circuitry that detects the oldest age of the memory array, the age detection circuit broadcasting the oldest age through the memory array;

scheduling logic that selects a ready entry from the plurality of entries of the memory array for dispatch to a port of the execution unit, a beginning scan point for selection of the ready entry being determined by the priority pointer.

2. The RS of claim 1 wherein the priority pointer comprises multi-bit vector that indicates a group of entries containing the oldest entry.

3. The RS of claim 2 wherein each entry of the memory array has an associated counter that contains the age of the uop stored at each entry.

4. The RS of claim 3 wherein the age comprises an 8-bit value and the counter comprises a shift register.

5. The RS of claim 1 wherein the control circuitry comprises a domino logic circuit.

6. The RS of claim 4 wherein the group comprises four entries and the plurality of entries comprise twenty or more entries.

7. The RS of claim 1 wherein the control circuitry comprises a latch that stores a bit of the current age, the latch being coupled to the wired-OR connection.

8. The RS of claim 7 wherein the comparison logic comprises an AND gate having one input coupled to the latch and another input coupled to the age detection circuit to receive the oldest age.

9. The RS of claim 2 wherein the scheduling logic comprises two stage domino circuitry.

10. The RS of claim 9 wherein the two stage domino circuitry comprises a first stage circuit that disables all groups of entries except the group of entries containing the oldest entry, and a second stage that arbitrates on individual entries within the group of entries containing the oldest entry to select the ready entry.

11. The RS of claim 1 wherein the age detection circuit is coupled with the control circuitry through a wired-OR connection.

* * * * *